United States Patent
Terayama et al.

(10) Patent No.: US 10,459,768 B2
(45) Date of Patent: Oct. 29, 2019

(54) COMPUTER SYSTEM, MANAGEMENT SYSTEM, AND RESOURCE MANAGEMENT METHOD

(71) Applicant: HITACHI, LTD., Tokyo (JP)

(72) Inventors: Atsumi Terayama, Tokyo (JP); Toru Tanaka, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 225 days.

(21) Appl. No.: 15/541,132

(22) PCT Filed: Jan. 7, 2015

(86) PCT No.: PCT/JP2015/050236
§ 371 (c)(1),
(2) Date: Jun. 30, 2017

(87) PCT Pub. No.: WO2016/110950
PCT Pub. Date: Jul. 14, 2016

(65) Prior Publication Data
US 2017/0351553 A1    Dec. 7, 2017

(51) Int. Cl.
*G06F 9/50* (2006.01)
*G06F 9/455* (2018.01)

(52) U.S. Cl.
CPC ............ *G06F 9/5077* (2013.01); *G06F 9/455* (2013.01); *G06F 9/505* (2013.01); *G06F 9/5016* (2013.01); *G06F 9/5027* (2013.01)

(58) Field of Classification Search
CPC ...... G06F 9/5077; G06F 9/455; G06F 9/5016; G06F 9/5027; G06F 9/505
(Continued)

(56) References Cited

U.S. PATENT DOCUMENTS

2004/0143664 A1    7/2004  Usa et al.
2010/0229171 A1*   9/2010  Yoshimura .............. G06F 9/455
                                                                    718/1
(Continued)

FOREIGN PATENT DOCUMENTS

JP    2004-199561 A    7/2004
JP    2010-205209 A    9/2010
(Continued)

OTHER PUBLICATIONS

International Search Report for WO 20161110950 A1, dated Apr. 7, 2015.

*Primary Examiner* — Anna C Deng
(74) *Attorney, Agent, or Firm* — Volpe an Koenig, P.C.

(57) ABSTRACT

The management system according to the present invention, which manages a plurality of computers, manages instances that are implemented using allocated from the plurality of computers, and selects, from among a plurality of different instance implementation methods, an instance implementation method that matches instance configuration information, which is information including settings for configuring an instance and which includes particular settings, each indicating whether the instance needs to monopolize a physical resource, said selection being based the instance configuration information. The plurality of computers provide physical resources to the instance on the basis of the selected instance implementation method.

8 Claims, 14 Drawing Sheets

(58) Field of Classification Search
USPC .......................................................... 718/104
See application file for complete search history.

(56) References Cited

U.S. PATENT DOCUMENTS

| | | |
|---|---|---|
| 2011/0145831 A1 | 6/2011 | Imura |
| 2013/0097610 A1* | 4/2013 | Graham ................ G06F 9/5077 |
| | | 718/104 |
| 2013/0138812 A1 | 5/2013 | Assuncao et al. |

FOREIGN PATENT DOCUMENTS

| | | |
|---|---|---|
| WO | 2010/016104 A1 | 2/2010 |
| WO | 2013/078258 A1 | 5/2013 |

\* cited by examiner

Instance information table 212

| | | | Instance ID | | |
|---|---|---|---|---|---|
| | | | IST-A0-0001 | IST-A0-0004 | ... |
| 212-1 | Common | Template name | Web-std | App-gen | ... |
| | | Instance name | web_svr-01 | Test-t001 | ... |
| | | Implementation method | LPAR | LPAR | ... |
| | | User name | User71 | User23 | ... |
| 212-2 | Calculation resource | CPU #0 | Allocation mode | Share | Share | ... |
| | | | Operating frequency | 3GHz x4 | 2GHz x2 | ... |
| | | | Core count | 2 | 4 | ... |
| | | ... | ... | N/A | |
| 212-3 | Network resource | NIC #0 | Allocation mode | Share | Monopoly | ... |
| | | | Bandwidth | 10Gbps | 1Gbps | ... |
| | | | Port count | x1 | x1 | ... |
| | | | VLAN ID | 302 | 302 | ... |
| | | ... | ... | ... | |
| 212-4 | Storage resource | Storage #0 | Allocation mode | Monopoly | Share | ... |
| | | | Capacity | 120GB | 300GB | ... |
| | | | Layer | 2 | 1 | ... |
| | | | Redundancy path | x2 | x4 | ... |
| | | ... | ... | N/A | |
| 212-5 | Function | Transition | Non-stop | Invalid | ... |
| | | High availability | Valid | Invalid | ... |
| | | ... | ... | ... | ... |

Resource information table 213

| Apparatus ID | Physical device name | Independent physical resource name | Allocation mode | Usage rate |
|---|---|---|---|---|
| Server [ID:SVR-0701] | CPU | Core #0 – 7 | Share | 80% |
| | | Core #8 – 11 | Monopoly | - |
| | | Core #12 – 27 | Share | |
| | | Core #28 – 31 | Non-allocated | 0% |
| | Memory | Address#00 – 9F | Monopoly | - |
| | | Address#A0 – CF | Share | 90% |
| | | Address#D0 – FF | Non-allocated | 0% |
| | NIC | Slot#0 | Share | 40% |
| | | Slot#1 | Share | 45% |
| | | Slot#2 | Monopoly | - |
| Storage [ID: STR-03C0] | Processor | MP#01 | Share | 20% |
| | | MP#02 | Share | 80% |
| | Cache | Slot A0 | Share | 80% |
| | | Slot A1 | Share | 75% |
| | Port | P00-01 | Share | 50% |
| | | P02-10 | Share | 70% |
| | | P11-15 | Monopoly | - |
| | RAID group | RAID #00 | Share | 30% |

FIG. 8

Template information table 214

| | | Template name | Web-std |
|---|---|---|---|
| 214-1 | Common | Template ID | TMP3023-9002 |
| | | Implementation method | LPAR |
| | | User group | Group E |
| 214-2 | Calculation resource | CPU #0 | Allocation mode | Share／Monopoly |
| | | | Operating frequency | 2.4GHz, 2.7GHz, 3GHz |
| | | | Core count | x2 – x8 |
| 214-3 | | ... | ... |
| | Network resource | NIC #0 | Allocation mode | Share |
| | | | Bandwidth | 1Gbps/10Gbps |
| | | | Port count | x1 – x2 |
| 214-4 | | | VLAN ID | 100-1200 |
| | | ... | ... |
| | Storage resource | Disk #0 | Allocation mode | Monopoly |
| | | | Disk capacity | 40GB – 160GB |
| 214-5 | | | Layer | 1/2/3 |
| | | | Redundancy path | x1 – x4 |
| | | ... | ... |
| | Function | Transition | Non-stop／Stop／Invalid |
| | | High availability | Valid／Invalid |
| | | ... | ... |

FIG. 9

Topology information table 215

| | 215-1 | 215-2 | | | 215-4 | 215-5 | 215-6 | | | | |
|---|---|---|---|---|---|---|---|---|---|---|---|
| | | Physical computer | | | Ethernet Switch ID | FC switch ID | Storage apparatus | | | | |
| Instance ID | Resource pool ID | ID | CPUコア | NIC | | | ID | Port ID | Cache ID | Volume ID | RAID group ID |
| IST-A0-0001 | RP-A3 | SVR-0701 | Core 0-7 | #0 | [INW-0C50]:1 | [SNW-A7]:02:H, [SNW-A7]:15:S, [SNW-B7]:05:H, [SNW-B7]:20:S | STR-03C0 | P2, P3 | CPR#1 | VOL#11 | RG201 |
| IST-A0-0003 | RP-A3 | SVR-0701 | Core 3-4 | #1 | [INW-0C51]:1 | [SNW-A7]:03:H, [SNW-A7]:06:S | STR-03C0 | P4 | CPR#2 | VOL#12 | RG201 |
| IST-A0-0004 | RP-A3 | SVR-0702 | Core 8-12 | #0, #1 | [INW-0C53]:1, [INW-0C53]:2 | [SNW-B7]:06:H, [SNW-B7]:20:S | STR-03C0 | P3 | CPR#1 | | RG201 |
| ... | | | | | | | | | | | |

FIG.10

Candidate table 217a

| Candidate ID | Physical computer surplus resource (percentage) | | | Storage apparatus surplus resource (percentage) | | |
|---|---|---|---|---|---|---|
| | CPU | Memory | NIC | Spindle | Port | Cache |
| CDDT-01 | 10% | 30% | 90% | 75% | 80% | 45% |
| CDDT-02 | 40% | 80% | 95% | 20% | 70% | 60% |
| CDDT-03 | 10% | 15% | 15% | 75% | 80% | 55% |

FIG. 11A

Candidate table 217b

| Candidate ID | Physical computer Surplus resource (number) | | | Storage apparatus Surplus resource (number) | | |
|---|---|---|---|---|---|---|
| | CPU | Memory | NIC | Spindle | Port | Cache |
| CDDT-01 | 2 | 2 | 2 | 12 | 2 | 1 |
| CDDT-02 | 5 | 2 | 1 | 16 | 2 | 2 |
| CDDT-03 | 0 | 1 | 0 | 5 | 4 | 3 |

FIG. 11B

Template use frequency table 218

| Template ID | Use frequency | Difference | Approximation model |
|---|---|---|---|
| TMP3023-9002 | 182 | | 1/2-A model |
| Derivation 1 | 4 | +NIC x1 | 1/2-A model |
| Derivation 2 | 190 | +CPU Core x2 | 1/3-B model |
| TMP1198-0054 | 19 | | 1/4-B model |
| Derivation 1 | 25 | - CPU Core x2 | 1/3-A model |
| Derivation 2 | 144 | + CPU Core x4 | 1/3-B model |
| Derivation 3 | 12 | + HBA x1 | 1/3-A model |

FIG. 13

COMPUTER SYSTEM, MANAGEMENT SYSTEM, AND RESOURCE MANAGEMENT METHOD

TECHNICAL FIELD

The present invention relates to, in general, techniques related to a computer system, a management system, and a resource management method.

BACKGROUND ART

An IaaS (Infrastructure as a Service) that provides establishment of a predetermined system environment (for example, a WEB server system, a file server system, a DB system, and the like) as a service is known. A user can establish a system environment without performing establishment or the like of physical computers using IaaS via a terminal coupled to the Internet.

An IaaS business operator provides the IaaS by operating a computer system that includes a plurality of physical computers, a network apparatus, and a storage apparatus. The system environment is established on this computer system. A bare-metal method, a virtualization method, and an LPAR (Logical Partition) method are known as a method for establishing a system environment on the computer system.

The bare-metal method is a method of allocating all physical resources of physical devices (CPU (Central Processing Unit) and memory) included in a physical computer to one system environment.

The virtualization method is a method of virtualizing (establishing virtual devices) physical resources of physical devices included in a physical computer and allocating the physical resources to a plurality of system environments.

The LPAR method is a method of subdividing physical resources of physical devices included in a physical computer and allocating partial physical resources out of the subdivided physical resources to one system environment only among a plurality of system environments. PTL 1 discloses a technique of this LPAR method.

CITATION LIST

Patent Literature

[PTL 1]
Japanese Patent Application Publication No. 2004-199561

SUMMARY OF INVENTION

Technical Problem

When a system environment is established by the virtualization method or the LPAR method, the usage rate of physical resources in a physical computer is improved. However, in this case, since the physical resources of one physical computer are shared by a plurality of system environments, when a certain system environment in the plurality of system environments has a large load on physical resources, the performance of the other system environments may decrease. Although this problem does not occur when a system environment is established by the bare-metal method, the usage rate of physical resources of the physical computer decreases.

An object of the present invention is to provide a computer system, a management system, and a resource management method capable of establishing a system environment so that the usage rate of physical resources of a physical computer increases.

Solution to Problem

A computer system according to the present embodiment includes: a plurality of computers and a management system configured to manage the plurality of computers. The management system manages instances implemented by the plurality of computers allocating physical resources and selects an instance implementation method corresponding to instance configuration information among a plurality of different instance implementation methods on the basis of the instance configuration information, which is information including settings for configuring the instances and which includes a setting indicating whether monopolization of the physical resource of the instance is required. The plurality of computers provides the physical resource to the instance on the basis of the selected instance implementation method.

Advantageous Effects of Invention

It is possible to establish a system environment so that the usage rate of physical resources of a physical computer increases.

BRIEF DESCRIPTION OF DRAWINGS

FIG. 7 illustrates a configuration example of an instance information table.
FIG. 8 illustrates a configuration example of a resource information table.
FIG. 9 illustrates a configuration example of a template information table.
FIG. 10 illustrates a configuration example of a topology information table.
FIG. 11A illustrates a configuration example of a candidate table.
FIG. 11B illustrates a modified configuration example of the candidate table.
FIG. 13 illustrates a configuration example of a template use frequency table.

DESCRIPTION OF EMBODIMENTS

Figure 1:
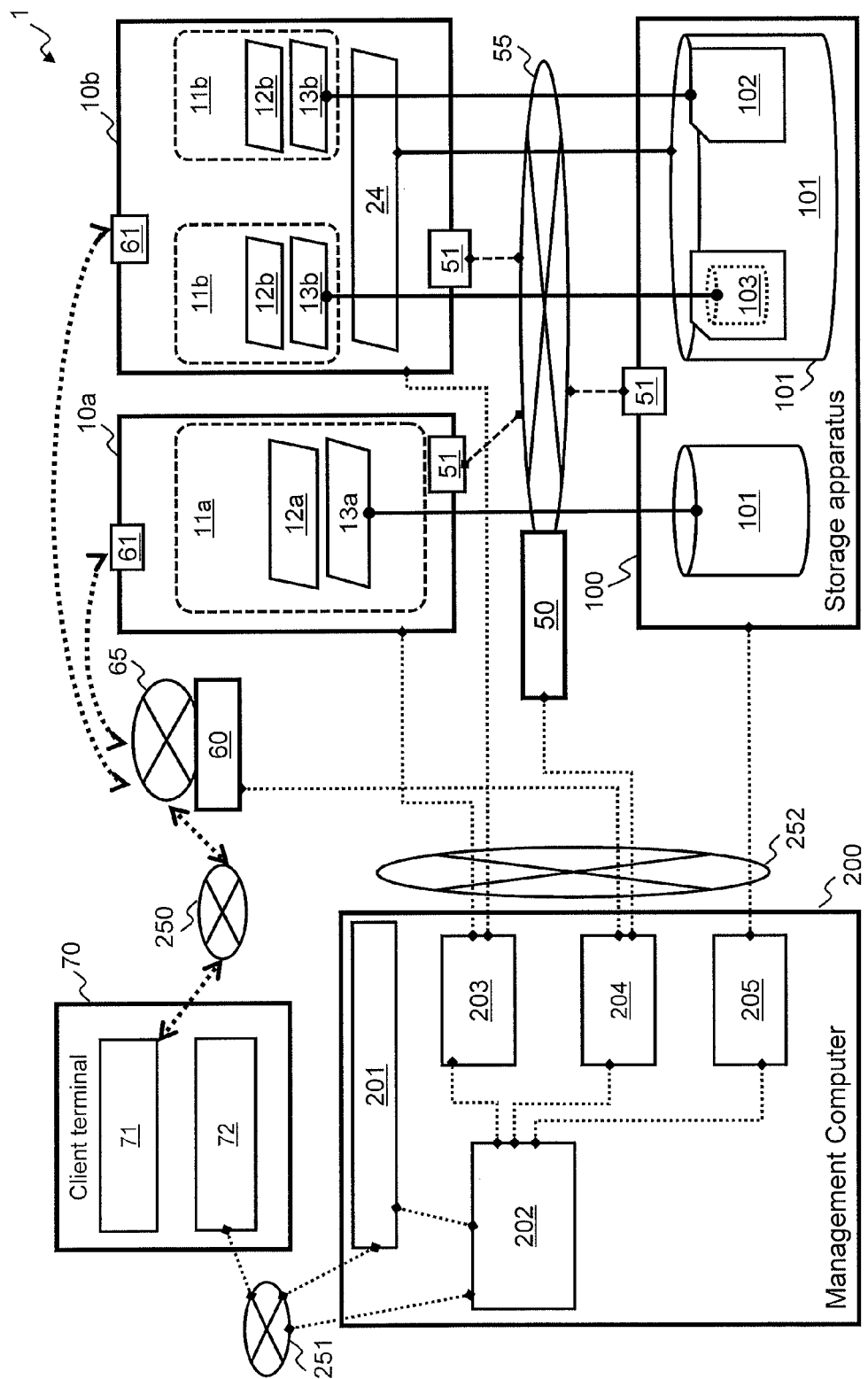
FIG. 1 illustrates a configuration example of a computer system according to the present embodiment.

Hereinafter, an embodiment will be described. In the following description, although information is sometimes described using an expression such as an "xxx table", the information may be expressed using an expression other than a data structure such as a table. Therefore, an "xxx table" and the like may sometimes be referred to as "xxx information" to show that information does not depend on a data structure.

Moreover, in the following description, although a processing unit (function) is described using an expression of a "kkk unit", the processing unit may be implemented by a processor (for example, CPU (Central Processing Unit) executing a computer program and may be implemented by a hardware circuit (for example, FPGA (Field Programmable Gate Array) or ASIC (Application Specific Integrated Circuit)). When the processing unit is implemented by a processor executing a program, since a predetermined process is performed while appropriately using a storage resource (for example, memory) and/or a communication interface device (for example, a communication port) or the like, the processing unit may be at least a portion of a processor. A processor described using a processing unit as a subject may be a process performed by a processor or an apparatus having the processor. Moreover, a processor may include a hardware circuit that performs a part or all of processes. A program may be installed from a program source to a processor. The program source may be, for instance, a program distribution computer or a computer-readable storage medium. Description of each processing unit is an example, and a plurality of processing units may be combined into one processing unit and one processing unit may be subdivided into a plurality of processing units.

Moreover, in the following description, when the same types of elements are described while being distinguished from each other, alphabet as reference numerals may be used like "xxx 10a" and "xxx 10b" and when the same types of elements are described without being distinguished from each other, only a common number of the reference numerals may be used like "xxx 10".

Moreover, in the following description, a management system may include one or more computers. Specifically, for example, when a management computer displays information (specifically, a management computer displays information on a display device thereof or a management computer transmits display information to a remote display computer), the management computer is a management system. Moreover, for example, when a function equivalent to that of a management computer is implemented by a plurality of computers, the plurality of computers (which may include a display computer when the display computer displays information) is a management system.

Moreover, the management computer includes an interface device coupled to one or more I/O devices including a display device, a storage resource (for example, memory) that stores information, and a processor coupled to the interface device and the storage resource. The display device may be a display device included in the management computer and may be a display computer coupled to the management computer. The I/O device may be an I/O device (for example, a keyboard, a pointing device, and a touch panel) included in the management computer and may be a display computer coupled to the management computer or another computer. A management computer "displaying display information" means displaying display information on a display device. This may mean displaying display information on a display device included in the management computer and may mean a management computer transmitting display information to a display computer (in the latter case, display information is displayed by a display computer). Moreover, a management computer inputting and outputting information means inputting and outputting information from and to an I/O device included in the management computer and may mean inputting and outputting information from and to a remote computer (for example, a display computer) coupled to the management computer. Outputting of information may mean displaying of information.

FIG. 1 illustrates a configuration example of a computer system 1 according to the present embodiment.

The computer system 1 includes a plurality of physical computers 10, a storage apparatus 100, and a management computer 200 that manages these components. These apparatuses 10, 100, and 200 are coupled by Predetermined networks 55, 65, and 252 and can transmit and receive data to and from each other.

Each physical computer 10, the management computer 200, and the storage apparatus 100 may be coupled to a SAN (Storage Area Network) 55 via a HBA (Host Bus Adapter). The SAN 55 may be an FC SAN that includes a FC (Fibre Channel) switch 50, a HBA 51, and the like. The HBA may be coupled to another HBA or the FC switch 50 via a port. The SAN 55 may be configured using an element other than a fibre channel. For example, the SAN 55 may be configured using iSCSI, FCoE, or Infini-band.

Each physical computer 10 and the management computer 200 may be coupled to a predetermined network via a NIC (Network Interface Card). The network may be configured by an Ethernet (registered trademark) switch 60, a cable, and the like. Each physical computer 10 may transmit and receive application data, control information, and the like via a network. Protocols such as TCP/IP (Transmission Control Protocol/Internet Protocol) may be used for communication on the network.

In FIG. 1, the network is subdivided into a LAN 65, a service network 250, and management networks 251 and 252.

A service client 71 of the client terminal 70 and an application 12 implemented on the physical computer 10 may transmit and receive data necessary for an information processing service via the service network 250.

Control components of respective apparatuses may transmit and receive control data for managing the constituent elements of respective apparatuses via the management networks 251 and 252.

The plurality of physical computers 10 and the management computer 200 that are configured in a data center may transmit and receive various items of data via the LAN 65.

These networks may be physically separated and may be logically separated by, for instance, the setting (ULAN (Virtual LAN), virtual local area network) of Layer-3 or Layer-2 switches.

The client terminal 70 which is one type of computers can transmit and receive data to and from the computer system 1 via the service network 250 and/or the management network 251. A user can send a request for the configuration of a service network to the computer system 1 via the client terminal 70. A system environment configured on the computer system 1 is referred to as an instance 11. The instance 11 may be configured by a guest OS 13 and an application 12 and may be configured by the guest OS 13 only. An example of the application 12 includes a WEB server, a file server, and a database server, or a combination thereof.

The instance 11 is implemented on the physical computer 10 that forms the computer system 1. An implementation method for implementing the instance 11 includes a first implementation method in which physical resources provided by one physical computer 10 are allocated to a plurality of instances in a sharable manner. The implementation method for implementing the instance 11 also includes a second implementation method in which all or a portion of physical resources provided by one computer are allocated to one instance in a monopolizable manner. An example of the first implementation method is a virtualization method. An example of the second implementation method is a bare-metal method and a LPAR method.

The physical computer 10 configured by the bare-metal method is referred to as a bare-metal host 10a, the physical computer 10 configured by the virtualization method is referred to as a virtual machine host 10b, and the physical computer 10 configured by the LPAR method is referred to as a LPAR host 10c. The details of these hosts will be described later (see FIG. 3).

The client terminal 70 may have a service client 71 and a management client 72 as its functions. The service client 71 receives an information processing service from the application 12 on the instance 11. The management client 72 is coupled to the management computer 200 to manage the configuration of the computer system 1. The service client 71 and the management client 72 may be a dedicated program and may be a general program executed by a WEB browser or the like. The service client 71 and the management client 72 may be collectively disposed in one client terminal 70 and may be separately disposed in a plurality of client terminals 70.

The storage apparatus 100 provides a data storage area to each instance 11. The storage apparatus 100 includes a CPU, a memory, a storage device, and the like, and a program or the like for controlling the storage device may be executed. An example of the storage device includes a HDD (Hard Disk Drive) and a SSD (Solid State Drive).

The storage apparatus 100 may form a volume 101 which is a logical storage area from a physical storage area of the storage device and provide the volume 101 to each instance 11.

The guest OS 13 associated with the bare-metal host 10a may read and write data with respect to the volume 101.

In the virtual machine host 10b, the virtualization mechanism 24 may subdivide the volume 101 to forma plurality of virtual volumes. The guest OS 13b associated with the virtual machine host 10b may read and write data with respect to the virtual volume allocated thereto.

The management computer 200 manages instances implemented by a plurality of physical computers allocating physical resources. Moreover, the management computer 200 selects an instance implementation method corresponding to instance configuration information among a plurality of different instance implementation methods on the basis of the instance configuration information which is information including settings for configuring an instance and which includes a setting indicating whether monopolization of the physical resource of the instance is required. The instance configuration information may be instance requirements to be described later or instance information stored in an instance information table.

The management computer 200 manages, for instance, the physical computer 10, the storage apparatus 100, and the network apparatuses 50 and 60 that form the computer system 1. The management computer 200 has functions associated with an application management unit 201, an integrated resource management unit 202, a computer management unit 203, a network management unit 204, and a storage management unit 205. These functions 201 to 205 may be collectively referred to as a management function.

The application management unit 201 provides an I/F for allowing the client terminal 70 to manage the application 12 on the instance 11. The computer management unit 203 manages the configuration of the physical computer 10. The network management unit 204 manages the configuration of the network apparatus (for example, the FC switch 50 and a network adapter). The storage management unit 205 manages the configuration of the storage apparatus 100.

The integrated resource management unit 202 has a function of simplifying complex resource management between these elements 201 to 205. The user can easily perform complex resource management with the aid of the integrated resource management unit 202.

Figure 2:
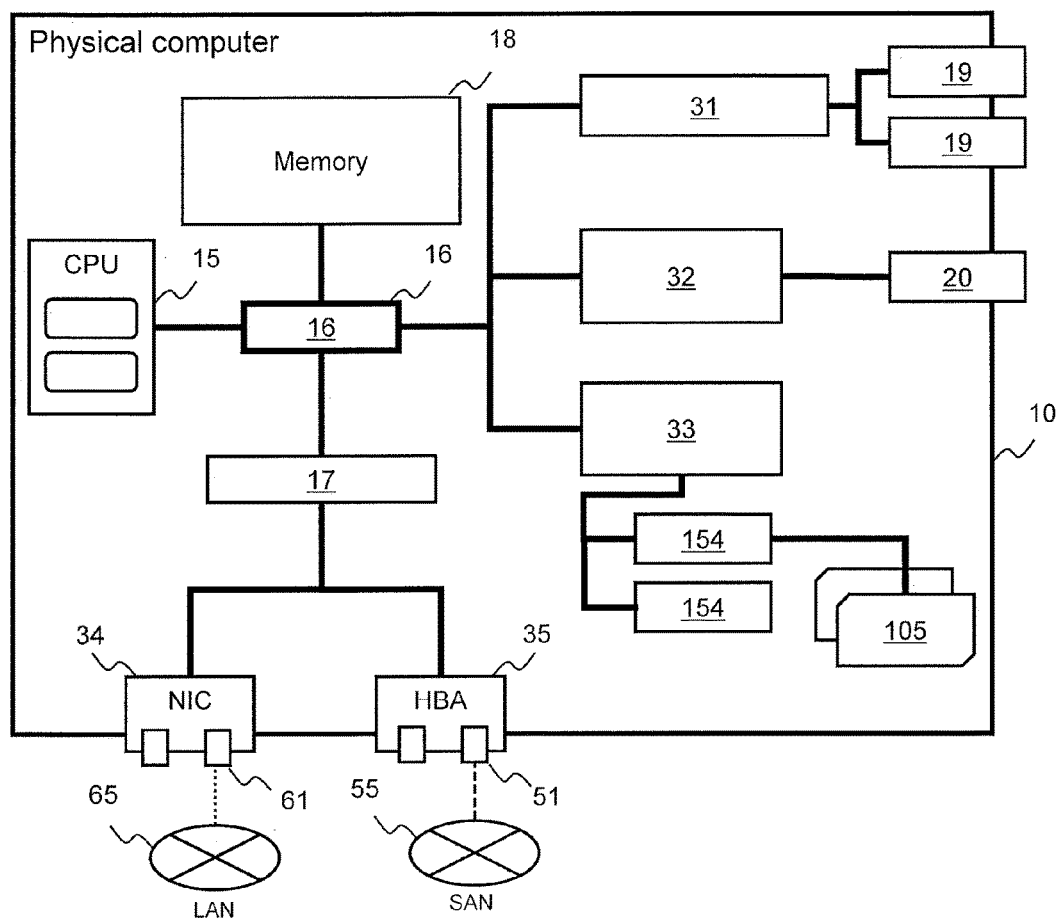
FIG. 2 illustrates an example of a physical device included in a physical computer.

FIG. 2 illustrates an example of a physical device included in the physical computer 10.

The physical computer 10 may have a plurality of physical devices coupled via a data bus 16. As the physical devices, the physical computer 10 may include a CPU 15, a memory 18, an I/O (Input/Output) controller 31, a graphic controller 32, a disk controller 33, a USB (Universal Serial Bus) I/F 19, a VGA (Video Graphics Array) I/F 20, a SAS (Serial Attached SCSI) I/F 154, a storage disk 105, a NIC 34, a HBA 35, and a PCIe (Peripheral Component Interconnect Express) switch 17.

The CPU 15 and the memory 18 may be coupled to the I/O controller 31, the graphic controller 32, and the disk controller 33 via the data bus 16. Moreover, the CPU 15 and the memory 18 may be coupled to the NIC 34 and the HBA 35 via the data bus 16 and the PCIe switch 17.

The controllers 31, 32, and 33 control destination physical devices. The USB I/F 19 may be coupled to the I/O controller 31. The VGA I/F 20 may be coupled to the graphic controller 32. The SAS I/F 154 may be coupled to the disk controller 33. Moreover, a HDD may be coupled to the SAS I/F 154 as one type of the storage disk 105.

Respective physical devices may transmit and receive data to and from each other via the data bus 16 and the PCIe switch 17 according to PCIe.

Figure 3:
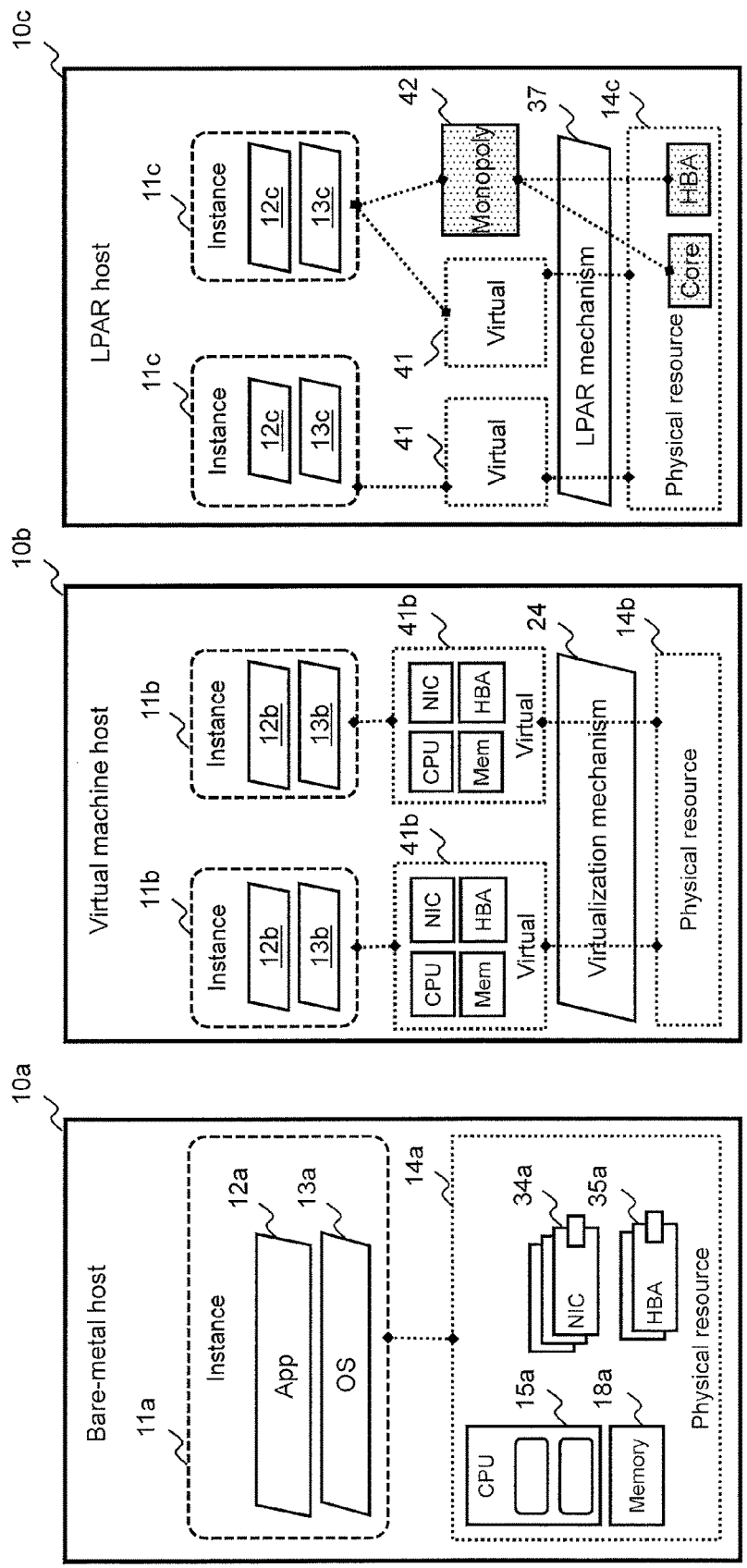
FIG. 3 illustrates a configuration example of a bare-metal host, a virtual machine host, and an LPAR host.

FIG. 3 illustrates a configuration example of the bare-metal host 10a, the virtual machine host 10b, and the LPAR host 10c.

In the bare-metal host 10a, physical resources 14a provided by physical devices (the CPU 15a, the memory 18a, the NIC 34a, the HBA 35a, and the like) are directly allocated to the instance 11a implemented in the bare-metal host 10a. Therefore, the guest OS 13a associated with the instance 11a can monopolize all physical resources 14a provided by the physical devices of the bare-metal host 10a.

In the bare-metal host 10a, since the physical resources 14a are not used from instances other than the specific instance 11a, the usage rate of the physical resources 14a of the bare-metal host 10a is likely to be lower than the usage rate of the physical resources 14b and 14c of the virtual machine host 10b and the LPAR host 10c to be described later. However, since instances that share the physical resources 14a are not present, the instance 11a will not be influenced by other instances. The usage rate is a value indicating the percentage of physical resources being used temporally or spatially among available physical resources. The details of the usage rate will be described later (see FIG. 8).

The virtual machine host 10b includes a virtualization mechanism 24. The virtualization mechanism 24 may be configured as hardware or software. The virtualization mechanism 24 subdivides physical resources 14b of physical devices to form a plurality of virtual devices. A resource provided by this virtual device is referred to as a virtual resource 41. The virtualization mechanism 24 allocates the virtual resources 41b obtained by subdividing the physical resources 14*b* to each of the plurality of instances 11*b* implemented in the virtual machine host 10*b*. Therefore, the guest OS 13*b* of each instance 11*b* can use the virtual resources 41*b* allocated by the virtualization mechanism 24 only among the physical resources 14*b*.

In IaaS, the virtual machine host 10*b* is often configured. The reason is as below. In the virtual machine host 10*b*, since the physical resources 14*b* are used by being shared from the plurality of instances 11*b*, the usage rate of the physical resources 14*b* of the virtual machine host 10*b* is likely to be higher than the usage rate of the physical resources 14*a* of the bare-metal host 10*a*. When the amount of the physical resources 14*a* allocated to the instance 11*a* is increased, the bare-metal host 10*a* may need to increase the number of physical devices. However, the virtual machine host 10*b* may change the setting of the virtualization mechanism 24 so that the amount of the physical resources 14*b* allocated to the virtual resources 41*b* is increased.

However, in the virtual machine host 10*b*, the instance 11*b* may be influenced by other instances. For example, when the processing load of a plurality of instances 11*b* the virtual machine host 10*b* increases simultaneously, the physical resource 14*b* shared from the plurality of instances 11*b* may become a performance bottleneck. Therefore, when it is desired to establish an instance (for example, a DB server or the like) having a stable I/O performance, it is not suitable to establish the instance 11*b* in the virtual machine host 10*b*.

The LPAR host 10*c* has a LPAR mechanism 37. The LPAR mechanism 37 may be configured as hardware or software.

Although a physical device provides a physical resource 14*c*, a predetermined physical device may be able to further provide a plurality of independent physical resources (hereinafter referred to as "independent physical resources"). The independent physical resource is not influenced by the situation of other independent physical resources.

When the physical device is the CPU 15, each core of the CPU 15 can be the independent physical resource. When the physical device is the memory 18, each segment obtained by subdividing an address space of the memory 18 can be an independent physical resource.

When the physical device is the storage apparatus 100, spindles (for example, a plurality of HDDs) of the storage apparatus 100 can be independent physical resources. When the physical device is the network apparatuses 34, 35, and the like, the ports 61 and 51 of the general DB address pointers are independent physical resources.

When the physical device is the controllers 31, 32, and 33, the I/Fs 19, 20, and 154 coupled to the controllers 31, 32, and 33 can be independent physical resources. Moreover, a physical address of a data cache, a RAID group, a HDD, a physical port on a network switch, and the like may be independent physical resources.

Moreover, a physical device having a SR-IOV (Single Root Input Output Virtualization) function can perform multiplexing of logical addresses on the physical device and provide logically independent physical areas to the instance 11. Therefore, the respective logically independent physical areas may be used as independent physical resources for a physical device having the SR-IOV function. For example, when the NIC 34 has the SR-IOV function, although the NIC 34 is a physically single NIC, NICs which are logically handled as a plurality of NICs may be used as independent physical resources.

The LPAR mechanism 37 can control whether independent physical resources are allocated to one instance 11 in a monopolizable manner or the independent physical resources are allocated to a plurality of instances 11 in a sharable manner. When the independent physical resources are allocated to a plurality of instances 11, the LPAR mechanism 37 may configure a plurality of virtual resources from the independent physical resources and allocate the virtual resources to the instance 11. The independent physical resource allocated to one instance 11 in a monopolizable manner is referred to as a monopolized resource 42. The independent physical resource allocated to the plurality of instances 11 in a sharable manner is referred to as a shared resource.

A configurational difference between the bare-metal host 10*a* and the virtual machine host 10*b* is the present or absence of the virtualization mechanism 24. Therefore, the virtualization mechanism 24 may be introduced to the bare-metal host 10*a* to form the virtual machine host 10*b*, and conversely, the virtualization mechanism 24 may be removed from the virtual machine host 10*b* to form the bare-metal host 10*a*.

A configurational difference between the bare-metal host 10*a* and the LPAR host 10*c* is the present and absence of the LPAR mechanism 37. Therefore, the LPAR mechanism 37 may be introduced to the bare-metal host 10*a* to form the LPAR host 10*c*, and conversely, the LPAR mechanism 37 may be removed from the LPAR host 10*c* to form the bare-metal host 10*a*.

A configurational difference between the virtual machine host 10*b* and the LPAR host 10*c* is the difference between the virtualization mechanism 24 and the LPAR mechanism 37. Therefore, the virtualization mechanism 24 of the virtual machine host 10*b* may be changed to the LPAR mechanism 37 to form the LPAR host 10*c*, and conversely, the LPAR mechanism 37 of the LPAR host 10*c* may be changed to the virtualization mechanism 24 to form the virtual machine host 10*b*.

Figure 4:
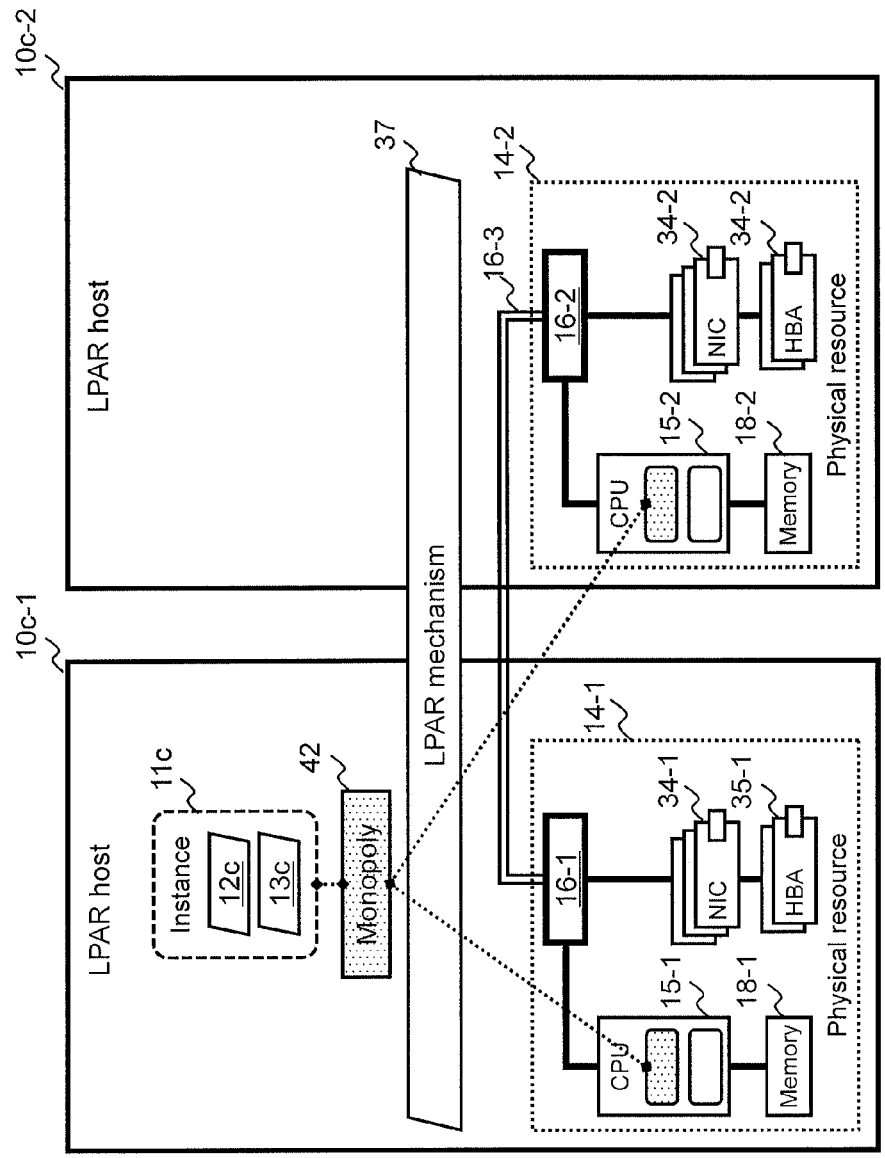
FIG. 4 illustrates a configuration example in which a plurality of LPAR hosts are used in a coupled state.

FIG. 4 illustrates a configuration example in which a plurality of LPAR hosts 10*c* are used in a coupled state.

When a plurality of LPAR hosts 10*c* are coupled via a data bus, the LPAR mechanisms 37 of the respective LPAR hosts 10*c* may cooperate so as to be able to use the physical resources 14 of the respective LPAR hosts 10*c*. For example, in the configuration illustrated in FIG. 4, a data bus 16-1 of a LPAR host 10*c*-1 and a data bus 16-2 of a LPAR host 10*c*-2 are coupled by an interconnect 16-3.

In this way, the LPAR mechanism 37 can allocate an independent physical resource of the LPAR host 10*c*-2 different from the LPAR host 10*c*-1 in which the instance 11*c* is configured to the instance 11*c*. For example, in FIG. 4, the LPAR mechanism 37 allocates the core of a CPU 15-2 of the LPAR host 10*c*-2 to the instance 11*c* configured in the LPAR host 10*c*-1.

When a plurality of LPAR hosts 10*c* are used in a coupled state, one of the plurality of LPAR hosts 10*c* may be selected as a representative node, and the identifier of the representative node may be used as the identifier of the plurality of LPAR hosts 10*c*.

In general, the interconnect 16-3 has longer latency than the data bus 16. Therefore, the LPAR mechanism 37 may allocate a physical resource 14-1 coupled by the data bus 16-1 in the LPAR host 10*c*-1 in which the instance 11*c* is configured preferentially to the instance 11*c*, and when it is not possible to allocate the physical resource 14-1, may allocate a physical resource 14-2 at the end of the interconnect 16-3 in another LPAR host 10*c*-2 to the instance 11.

The guest OS 13*c* on the instance 11*c* may have a function of detecting a set of physical resources 14-1 (for example, the set composed of the CPU 15-1 and the memory 18-1) coupled to the data bus 16-1 in order to deal with such latency. For example, the guest OS 13*c* corresponding to a NUMA (Non-Uniform Memory Access) architecture has such a function.

Figure 5:
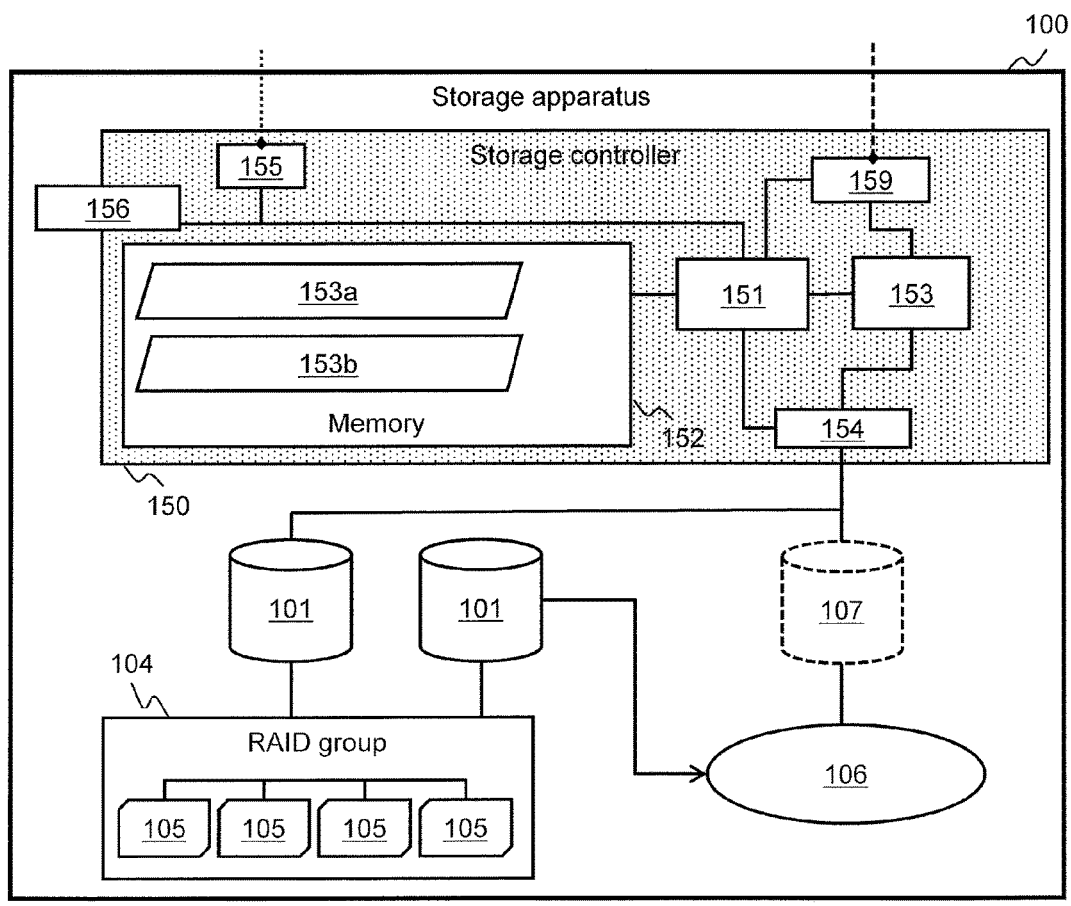
FIG. 5 illustrates a configuration example of a storage apparatus.

FIG. 5 illustrates a configuration example of the storage apparatus 100.

The storage apparatus 100 stores data which is write-requested from the physical computer 10 (or the instance 11 of the physical computer 10 in FIG. 5, the same hereinbelow) and returns read-requested data to the physical computer 10.

The storage apparatus 100 includes, for example, a processor 151, a memory 152, a cache memory 153, a SATA (Serial ATA) I/F 154, a HBA 159, a NIC 155, a storage medium 105, and a data bus 156 to which these elements are coupled. The processor 151, the memory 152, the cache memory 153, the SATA I/F 154, the HBA 159, and the NIC 155 may be collectively referred to as a storage controller 150. The storage apparatus 100 may configure a RAID group 104 from a plurality of storage media 105.

The HBA 159 is coupled to the SAN 55 and transmits and receives a write request, a read request, and the like to and from the physical computer 10. The NIC 155 is coupled to the management network 252 and transmits and receives a control request and the like to and from the management computer 200. The SATA I/F 154 is coupled to the RAID group 104 and transmits and receives read data and write data to and from the RAID group 154.

The cache memory 153 provides faster I/O than the storage medium 105. The read data and the write data transmitted and received via the SATA I/F 154 are temporarily stored in the cache memory 153. This is to accelerate the response of the storage controller 150 to the physical computer 10.

The processor 151 executes a response program 153*a*, a control program 153*b*, and the like stored in the memory 152 to implement various functions of the storage apparatus 100.

The response program 153*a* is a program that returns a response to the read request and the write request transmitted from the physical computer 10. The control program 153*b* is a program that configures a logical volume 101 from a storage area of the RAID group 104 and provides the volume 101 to the physical computer 10.

The control program 153*b* may configure a storage pool 106 from a storage area of the RAID group 104 and may configure the virtual volume 107 from the storage pool 106. Moreover, when write data is stored in the virtual volume 107, the control program 153*b* may secure an area for storing the write data in the storage pool 106. This is to allow the physical computer 10 to use the storage area of the RAID group 104 without any waste.

The volume 101 and the virtual volume 107 may be referred to as a storage resource. The storage resource may be an independent physical resource.

The control program 153*b* may manage the physical computer 10 (the instance 11) to which the storage resource is allocated and/or whether the storage resource is allocated as a monopolized resource or a shared resource.

Figure 6:
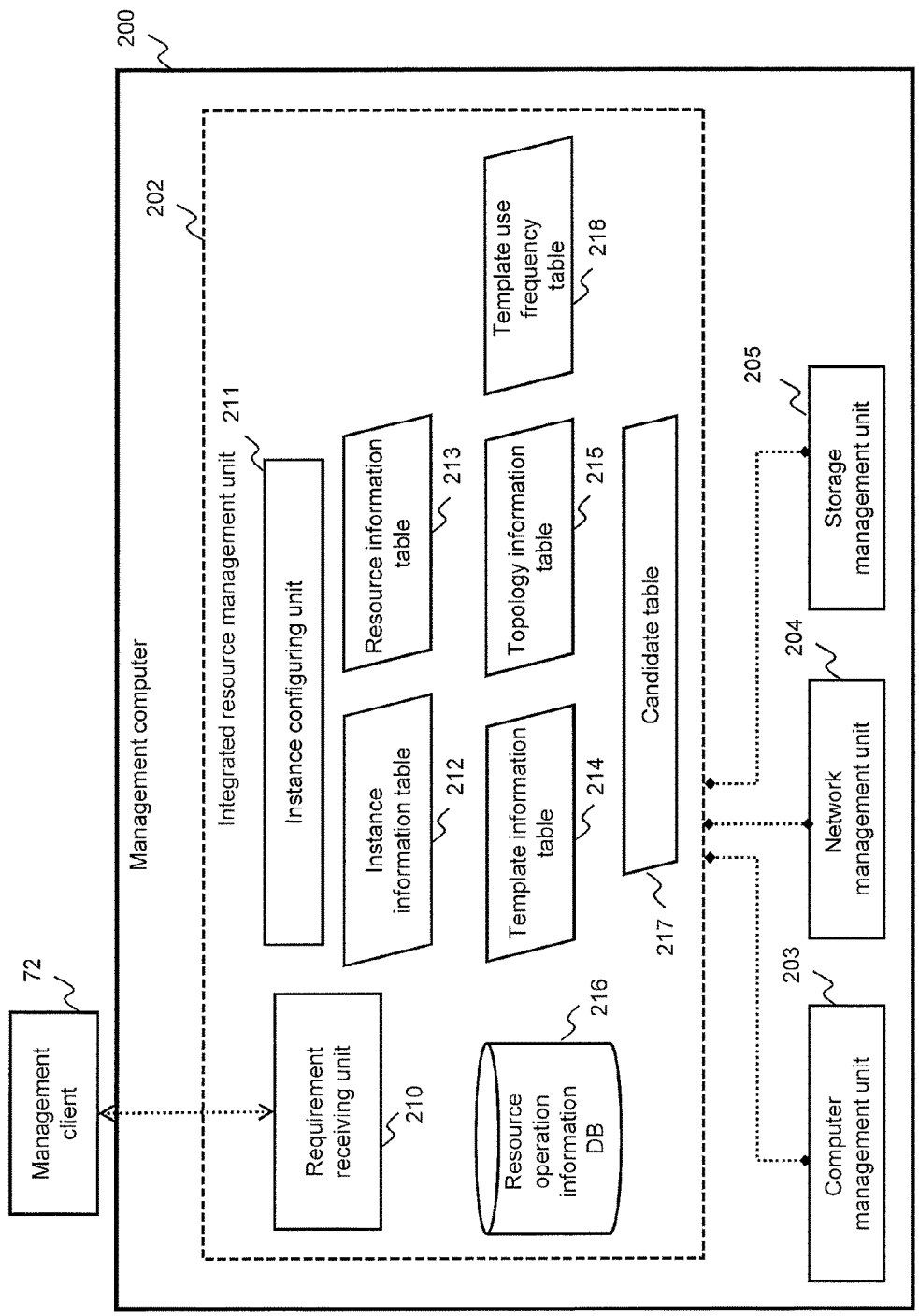
FIG. 6 illustrates a configuration example of the functions of a management computer.

FIG. 6 illustrates a configuration example of the functions of the management computer 200.

The management computer 200 has the integrated resource management unit 202, the computer management unit 203, the network management unit 204, and the storage management unit 205 as examples of the functions. The integrated resource management unit 202 may include an instance configuring unit 211, a requirement receiving unit 210, an instance information table 212, a resource information table 213, a template information table 214, a template use frequency table 218, a topology information table 215, a candidate table 217, and a resource operation information database 216. History information including information on past operation performance of each apparatus may be stored in the resource operation information database 216.

The instance configuring unit 211 controls each physical computer 10 on the basis of the information stored in the respective tables 212 to 217 so that the instance requirements are satisfied and the usage rate of the physical resource 14 of the physical computer 10 is increased as much as possible. The instance requirements may include information on requirements for the instance 11 requested by a user. For example, the instance requirements may include information on constituent resources of the instance 11 and information on functions, performance, and quality required for the resources. The instance configuring unit 211 may use resources for which high quality is designated in the instance requirements as monopolized resources and may use the other resources as shared resources.

The requirement receiving unit 210 receives instance requirements from the management client 72 of the client terminal 70. The requirement receiving unit 210 delivers the received instance requirements to the instance configuring unit 211 appropriately. For example, when the same resource is requested in a plurality of instance requirements, the requirement receiving unit 210 may deliver a previously received instance requirement to the instance configuring unit 211 and may temporarily hold off a subsequently received instance requirement.

In the instance information table 212, instance information which is information on the configuration of the instance 11 is stored for each of the instances 11 configured in the computer system 1. The details of the instance information table 212 will be described later (see FIG. 7).

In the resource information table 213, independent physical resource information which is information on independent physical resources possessed by the physical device is stored for each of the physical devices. The details of the resource information table 213 will be described later (see FIG. 8).

Template information is stored in the template information table 214. A user can create instance requirement more easily using the template information. The details of the template information table 214 will be described later (see FIG. 9).

In the topology information table 215, information (referred to as "topology information") indicating a resource that form the instance 11 and a physical device associated with the resource is stored for each of the instances 11 configured in the computer system 1. The details of the topology information table 215 will be described later (see FIG. 10).

In the candidate table 217, candidates for the physical computer 10 for a deployment destination of the instance 11 are stored in the course of a process of creating the instance 11. The details of the candidate table 217 will be described later (see FIG. 11).

Information on the use frequency of template information is stored in the template use frequency table 218. The details of the template use frequency table 218 will be described later (see FIG. 13).

FIG. 7 illustrates a configuration example of the instance information table 212.

The instance information of each instance 11 configured in the computer system 1 is stored in the instance information table 212.

The instance information may include an instance ID, common information 212-1, calculation resource information 212-2, network resource information 212-3, storage resource information 212-4, and function information 212-5. The instance ID is information for identifying the instance 11.

The common information 212-1 includes information common to the instances 11 of the instance IDs. The common information 212-1 includes a template name, an instance name, an instance implementation method, and a user name, for example.

The template name indicates the name of template information on which the instance 11 of the instance ID is based. The instance name indicates the name of the instance 11 of the instance ID. The instance implementation method indicates whether the instance 11 of the instance ID is implemented by the "bare-metal method", the "virtualization method", or the "LPAR method", for example. The user name indicates the name of a user who possesses the instance 11 of the instance ID.

The calculation resource information 212-2 includes information on a physical resource related to calculation allocated to the instance of the instance ID. For example, the calculation resource information 212-2 includes an allocation mode, an operating frequency, and a core count for each CPU resource allocated to the instance 11.

The allocation mode related to the CPU resource indicates whether the CPU resource allocated to the instance 11 of the instance ID is a monopolized resource or a shared resource. A CPU resource of which the allocation mode is "monopoly" is not used from an instance other than the instance 11 of the instance ID. A CPU resource of which the allocation mode is "share" may be used from an instance other than the instance 11 of the instance ID.

The operating frequency indicates an operating frequency of the CPU resource. The core count indicates the number of cores possessed by the CPU resource.

The network resource information 212-3 includes information on a physical resource related to a network allocated to the instance 11 of the instance ID. For example, the network resource information includes an allocation mode, a bandwidth, a port count, and a VLAN ID for each NIC resource allocated to the instance 11.

The allocation mode associated with the NIC resource indicates whether the NIC resource allocated to the instance 11 of the instance ID is a monopolized resource or a shared resource. The NIC resource of which the allocation mode is "monopoly" is not used from an instance other than the instance 11 of the instance ID. The NIC resource of which the allocation mode is "share" may be used from an instance other than the instance 11 of the instance ID.

The bandwidth indicates a largest bandwidth of the NIC resource. The port count indicates the number of ports included in the NIC resource. The VLAN ID indicates the ID of a VLAN set to the NIC resource.

The storage resource information 212-4 includes information on a physical resource related to a storage allocated to the instance 11 of the instance ID. For example, the storage resource information 212-4 includes an allocation mode, a capacity, a layer, and a redundancy path for each virtual storage allocated to the instance 11.

The allocation mode associated with the storage indicates whether a storage resource allocated to the instance 11 of the instance ID is a monopolized resource or a shared resource. A storage resource of which the allocation mode is "monopoly" is not used from an instance other than the instance 11 of the instance ID. A storage resource of which the allocation mode is "share" may be used from an instance other than the instance 11 of the instance ID.

The capacity indicates a largest storage capacity of the storage resource. The layer indicates a layer (tier) of the storage resource. The redundancy path indicates the number of redundancy paths of the storage resource.

The function information 212-5 includes information on a function set to the instance 11 of the instance ID. For example, the function information 212-5 includes a transition function and a high availability function.

The transition function is a function related to transition of the instance 11 of the instance ID. For example, an instance 11 of which the transition function is "nonstop" has a function necessary for transition in a nonstop state.

The high availability function is a function related to availability of the instance 11 of the instance ID. For example, an instance 11 of which the high availability function is "valid" has a function necessary for high availability operation.

A user can designate all or some of the items of the instance information using the instance requirement. That is, the instance requirement may include the same items as the instance information.

Items of the instance requirement, which are not designated from a user may be automatically set by the management computer 200. Items of the instance requirement, for which an incorrect value is designated from a user may be automatically corrected by the management computer 200. When the values designated from the user have a mismatch between the items of the instance requirement, the mismatch may be automatically corrected by the management computer 200. "N/A" may be set to the items of the resources which are not allocated to the instance 11.

In FIG. 7, the instance 11 of the instance ID "IST-A0-0002" is implemented by the "LPAR method".

A CPU resource "CPU #0" allocated to the instance 11 is "share". Therefore, a calculation process by the CPU #0 of the instance 11 may be influenced by other instances.

A NIC resource "NIC #0" allocated to the instance 11 is "monopoly". Therefore, a communication process by the NIC #0 of the instance 11 is not influenced by other instances.

The storage resource "storage #0" allocated to the instance 11 is "share". Therefore, I/O to the storage #0 of the instance 11 may be influenced by other instances.

FIG. 8 illustrates a configuration example of the resource information table 213.

In the resource information table 213, information (referred to as "independent physical resource information") on an independent physical resource possessed by a physical device is stored for each physical device included in each physical computer 10.

The physical device of the physical computer 10 may have the following independent physical resources.

An independent physical resource associated with a CPU may be respective cores included in the CPU. For example, in the case of FIG. 8, each of the core groups of cores #0 to #7, cores #8 to #11, cores #12 to #17, and cores #28 to #31 of the CPU is one independent physical resource.

The independent physical resource associated with the memory may be one segment obtained by subdividing the storage area of the memory into a plurality of segments. For example, in the case of FIG. 8, each of the segments of addresses #00 to #9F, addresses #A0 to #CF, and addresses #D0 to #FF of the memory is one independent physical resource.

The independent physical resource associated with the NIC may be each slot included in the NIC. For example, in the case of FIG. 8, each of the slots #0, #1, and #2 of the NIC is one independent physical resource.

The physical device of the storage apparatus 100 may include the following independent physical resources.

The independent physical resource associated with the processor may be each processor. For example, in the case of FIG. 8, each of MPs #1 and #2 is one independent physical resource. The independent physical resource associated with the cache memory may be each slot. For example, each of the slots A0 and A1 of the record 213-5 in FIG. 8 is one independent physical resource. The independent physical resource associated with a port may be each port. For example, in the case of FIG. 8, each of the ports P00-01, P02-10, and P11-15 is one independent physical resource. The independent physical resource associated with the RAID group may be each RAID group. For example, in the case of FIG. 8, a RAID group "RAID#00" is one independent physical resource.

The independent physical resource information has an apparatus ID 213-1, a physical device name 213-2, an independent physical resource name 213-3, an allocation mode 213-4, and a usage rate 213-5 as examples of a field value.

The apparatus ID 213-1 is information for identifying an apparatus such as the physical computer 10 and the storage apparatus 100. The physical device name 213-2 indicates the name of a physical device included in an apparatus of the apparatus ID 213-1. The independent physical resource name 213-3 indicates the name of an independent physical resource included in the physical device of the physical device name 213-2.

The allocation mode 213-4 indicates whether the independent physical resource of the independent physical resource name 213-3 is "monopolized," "shared," or "non-allocated". The independent physical resource of which the allocation mode is "monopoly" is allocated to one instance 11. The independent physical resource of which the allocation mode is "share" may be allocated to a plurality of instances 11. The independent physical resource of which the allocation mode is "non-allocated" is not allocated to any instance 11.

The usage rate 213-5 is information indicating the usage rate of the independent physical resource of the independent physical resource name 213-3. The usage rate associated with a CPU may be a usage rate per unit time of a core group which is an independent physical resource. The usage rate associated with a memory may be a usage rate of each segment which is an independent physical resource. The usage rate associated with the NIC is a usage rate per unit time of one slot which is an independent physical resource. The usage rate associated with a processor may be a usage rate per unit time of one processor which is an independent physical resource. The usage rate associated with a cache memory may be a usage rate per unit time of one slot which is an independent physical resource. The usage rate associated with a port may be a usage rate per unit time of one port which is an independent physical resource. The usage rate associated with a RAID group may be a usage rate per storage capacity of one RAID group which is an independent physical resource.

FIG. 9 illustrates a configuration example of the template information table 214.

Template information is stored in the template information table 214. A default value usable for creating the instance requirement may be set to the template information. The template information may be created in advance by a business operator or the like of the computer system 1.

Template information of various patterns that comply with the user's needs may be stored in the template information table 214. For example, template information of various patterns corresponding to the performance, the use, or the cost of the instance 11 may be stored in the template information table 214. Different default values may be set to the template information of different patterns.

Selectable default values, upper and lower limits, non-changeable default values, and the like may be set to the template information.

A default value which is appropriately sized for an application to be operated on the instance 11 may be set to the template information. The default value may be calculated on the basis of resource requirements of an application and a configuration in which an exhibitable performance is estimated by a preliminary test operation or the like.

A default value appropriate for the configuration of the physical computer 10 and the storage apparatus 100 of the computer system 1 may be set to the template information.

A default value may be set to the template information such that the overall usage rate of the physical devices of the computer system 1 increases. For example, a default value that evenly divides the physical resource 14 of the respective physical devices may be set to the template information.

Options "monopoly" and "share" may be set to the template information as the default value of the allocation mode.

Options "monopoly" and "share" may be set to the template information of which the default value of the instance implementation method is "LPAR method" as the default value of the allocation mode. An option "monopoly" may be set to the template information of which the default value of the instance implementation method is "bare-metal method" as the default value of the allocation mode. An option "share" may be set to the template information of which the default value of the instance implementation method is "virtualization method" as the default value of the allocation mode.

The template information is not limited to the configuration illustrated in FIG. 9. For example, the template information may be configured such that information ("CPU resource occupancy type") indicating whether a specific independent physical resource is monopolized or shared can be set to the common information 214-1.

A user can create the instance requirement easily using the template information having a setting close to a desired instance configuration. Moreover, a business operator of the computer system 1 can easily make a plan for, for instance, extending and changing the resource configuration of the computer system 1 using the template information provided by the user.

FIG. 10 illustrates a configuration example of the topology information table 215.

The instance 11 deployed in the physical computer 10 and information on the physical resources used from the instance 11 are stored in the topology information table 215 in correlation.

The topology information table 215 has an instance ID 215-1, a resource pool ID 215-2, physical computer information 215-3, an Ethernet switch ID 215-4, a FC switch ID 215-5, and storage apparatus information 215-6 as examples of a field value.

The physical computer information 215-3 includes information a physical computer ID and the CPU core and the NIC associated with the independent physical resource, for example.

The storage apparatus information 215-6 includes information on a storage apparatus ID, a port ID associated with an independent physical resource, a cache ID, a volume ID, and a RAID group ID, for example.

The instance ID 215-1 is information for identifying the instance 11 deployed in the physical computer 10. The resource pool ID 215-2 indicates a resource pool to which the instance 11 of the instance ID 215a, the physical computer 10, and the like belong.

The physical computer ID indicates the physical computer 10 having the physical resource allocated to the instance 11 of the instance ID 215-1. That is, the instance 11 of the instance ID 215-1 is deployed in the physical computer 10 of the physical computer ID.

The CPU core indicates a core allocated to the instance 11 of the instance ID 215-1 among the cores associated with the independent physical resource of the CPU included in the physical computer 10 of the physical computer ID.

The NIC indicates a slot allocated to the instance 11 of the instance ID 215-1 among the slots associated with the independent physical resource of the NIC included in the physical computer 10 of the physical computer ID.

The Ethernet switch ID 215-4 indicates an Ethernet switch used by the instance 11 of the instance ID 215-1. That is, the physical computer 10 of the physical computer ID is coupled to this Ethernet switch.

The FC switch ID 215-5 indicates a FC switch used by the instance 11 of the instance ID 215-1. That is, the physical computer 10 of the physical computer ID is coupled to this FC switch.

The storage apparatus ID indicates the storage apparatus 100 having the storage resource allocated to the instance 11 of the instance ID 215-1.

The port ID, the cache ID, the volume ID, and the RAID group ID indicate a port, a cache, a volume, and a RAID group associated with the storage apparatus used by the instance 11 of the instance ID 215-1, respectively.

Since the physical computer 10, the storage apparatus 100, and the like are coupled via a network, it can be logically said that independent physical resources such as a different physical computer 10 and a different storage apparatus 100 can be allocated to the instance 11.

However, as described in FIG. 4, the performance of the instance 11 decreases as the network topological distance between the physical computer 10 in which the instance 11 deployed and the independent physical resource allocated to the instance 11 increases. Therefore, it is preferable to allocate an independent physical resource having a small network topological distance to the instance 11. The topology information table 215 is referred to when it is desired to know the network topological distance between physical devices. For example, it can be said that two physical computers 10 having the same FC switch has a small network topological distance.

Moreover, the topology information table 215 is referred to when it is desired to know the physical device and the physical resource allocated to a deployed instance 11.

For example, it can be said that CPU cores which have the same physical computer ID and are not correlated with any instance ID are "non-allocated".

FIGS. 11A and 11B illustrate a configuration example of the candidate table 217. The management computer 200 may employ the candidate table 217 illustrated in FIG. 11A or FIG. 11B.

A plurality of candidates for an instance configuration is stored in the candidate table 217. A candidate ID 217-1 is information for identifying a candidate for this instance configuration.

Information for calculating an evaluation index of the instance configuration of the candidate ID 217-1 may be stored in the candidate table 217. The evaluation index is a value serving as an index for determining one instance configuration among a plurality of candidates for the instance configuration.

The evaluation index of the physical computer 10 may be a surplus resource 217-2 of each of a CPU, a memory, and a NIC.

The evaluation index of the storage apparatus 100 may be a surplus resource 217-3 of each of a spindle, a port, and a cache.

The surplus resource may be represented by the percentage of the surplus resource in the entire resource as indicated by 217a-2 and 217a-3 in FIG. 11A and may be the number of non-allocated independent physical resources among a total number of independent physical resources as indicated by 217b-2 and 217b-3 in FIG. 11B.

Figure 12:
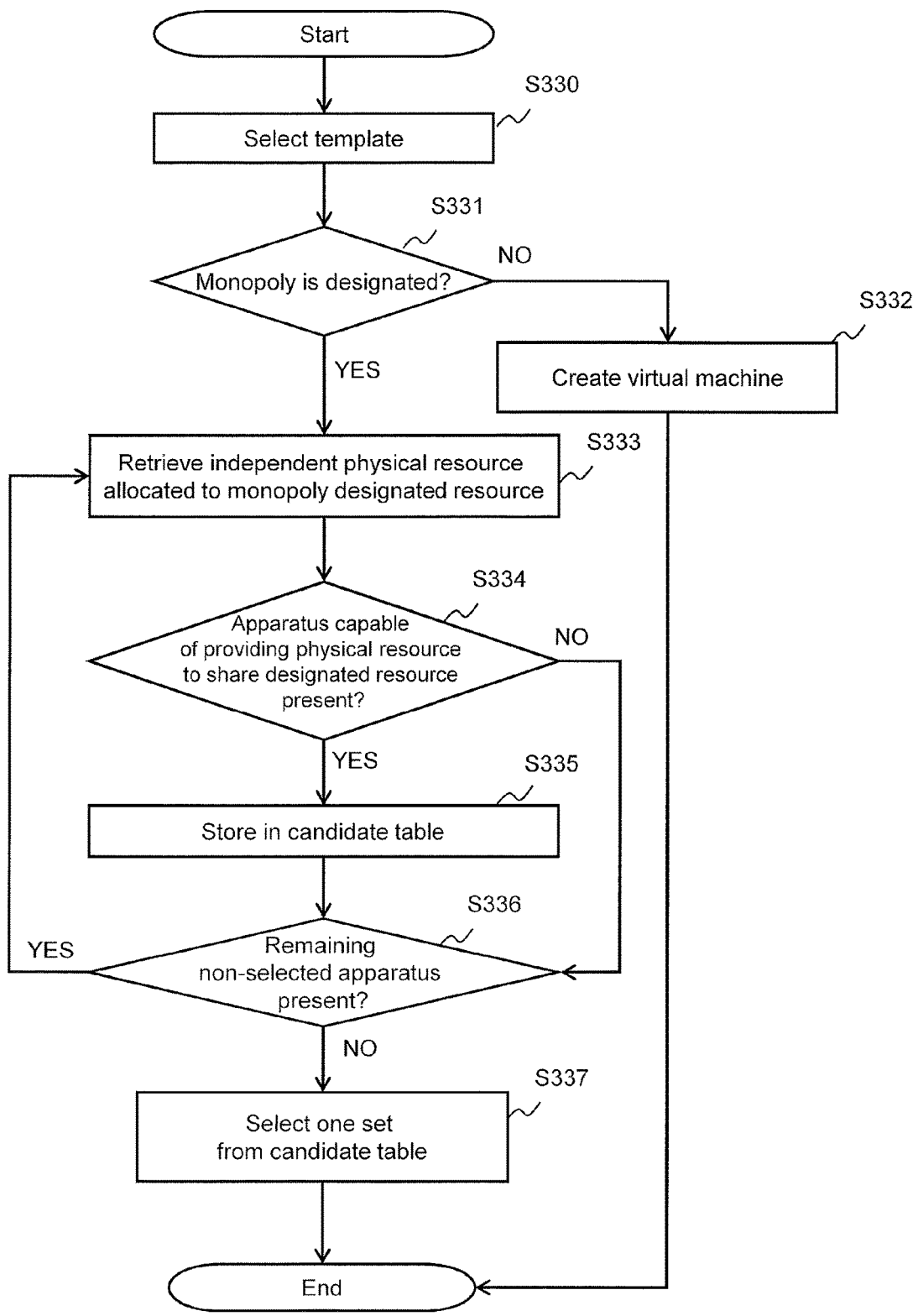
FIG. 12 is a flowchart illustrating an example of an instance creation process.

FIG. 12 is a flowchart illustrating an example of a process of creating the instance 11.

A user accesses the requirement receiving unit 210 of the management computer 200 via the management client 72 of the client terminal 70. Moreover, the user selects desired template information among a plurality of items of template information stored in the template information table 214 (S330).

The user creates an instance requirement using the selected template information. A default value, upper and lower limits, and/or options may be set to the items of the template information. The user may correct the respective items on the basis of the setting and create the instance requirement. When the value input or corrected by the user is incorrect, the requirement receiving unit 210 may notify the user of the fact that the value is incorrect.

Subsequently, the instance configuring unit 211 determines whether "monopoly" is designated to the allocation mode of any one of the instance requirement (S331). It can be said for a resource to which "monopoly" is designated that the user requires that the performance of the resource is to be guaranteed. It can be said for a resource to which "monopoly" is not designated that the user does not require that the performance of the resource is to be guaranteed.

When "monopoly" is not designated to the allocation mode of any instance requirement (S331: NO), the following process is performed. The instance configuring unit 211 creates the instance 11 on the basis of a virtualization method (S332). For example, the instance configuring unit 211 creates and deploys the instance 11 in the virtual machine host 10b. This is because, this user does not require the guaranteed performance of any resource, and the requirements of this user are satisfied even when the instance 11 is created and deployed in the virtual machine host 10b. Furthermore, a business operator of the computer system 1 can improve the usage rate of the physical resource in the computer system 1 by creating and deploying the instance 11 in the virtual machine host 10b.

When "monopoly" is designated to the allocation mode of any one of the instance requirement (S331: YES), the following process is performed. A resource for which "monopoly" is designated to the allocation mode of the instance requirement is referred to as a "monopoly designated resource". The instance configuring unit 211 retrieves the apparatus ID 213-1 of which the allocation mode 213-4 of the independent physical resource name 213-3 corresponding to the monopoly designated resource is "non-allocated" from the resource information table 213 (S333).

When "monopoly" is designated to a calculation resource of the instance requirement, the instance configuring unit 211 may retrieve a physical computer having a CPU in which "non-allocated" is included in the allocation mode from the resource information table 213.

When "monopoly" is designated to a network resource of the instance requirement, the instance configuring unit 211 may retrieve a physical computer having a NIC in which "non-allocated" is included in the allocation mode from the resource information table 213.

When "monopoly" is designated to a storage resource of the instance requirement, the instance configuring unit 211 may retrieve the storage apparatus 100 having a RAID group in which "non-allocated" is included in the allocation mode from the resource information table 213.

When "monopoly" is designated to both the calculation resource and the network resource of the instance requirement, the instance configuring unit 211 may retrieve a physical computer in which "non-allocated" is included in the allocation modes of both the CPU and the NIC from the resource information table 213.

The instance configuring unit 211 may apply the history information in the resource operation information database 216 to the usage rate 213-5 of the resource information table 213 or the like before executing the process of S333.

Subsequently, the instance configuring unit 211 selects one apparatus (referred to as a "target apparatus") among apparatuses retrieved in the process of S333. Moreover, the instance configuring unit 211 retrieves an apparatus (referred to as a "coupled apparatus") coupled to the target apparatus from the topology information table 215.

The instance configuring unit 211 determines whether any one of the retrieved coupled apparatuses can provide a physical resource to a resource (referred to as a "share designated resource") in which "share" is designated in the instance requirement (S334). The instance configuring unit 211 may perform the determination by referring to information associated with the coupled apparatus in the resource information table 213. When it was not possible to retrieve the coupled apparatus from the topology information table 215, the instance configuring unit 211 may retrieve a coupled apparatus which is not stored in the topology information table 215.

The reason why the coupled apparatus that can provide a physical resource to the instance 11 is retrieved from the topology information table 215 is as follows. An apparatus that provides a physical resource to a deployed instance 11 is stored in the topology information table 215. Therefore, by preferentially allocating the physical resource of the apparatus stored in the topology information table 215 to an instance 11 to be created newly, the usage rate of the physical resource per one apparatus can be increased.

When two or more coupled apparatuses capable of providing a physical resource to the instance 11 are retrieved from the topology information table 215, the instance configuring unit 211 may select a coupled apparatus which is at a smallest network topological distance from a target apparatus. In this way, the instance configuring unit 211 can reduce overhead resulting from latency between the target apparatus and the coupled apparatus as much as possible.

When any one of the coupled apparatuses can provide the physical resource to the share designated resource (S334: YES), the following process is performed. The instance configuring unit 211 assigns the candidate ID 217-1 to the set of the target apparatus and the coupled apparatus and registers the set associated with the candidate ID 217-1 to the candidate table 217 (S335). Subsequently, the instance configuring unit 211 performs the process of S336.

When any one of the coupled apparatuses cannot provide a physical resource to the share designated resource (S334: NO), the instance configuring unit 211 performs the process of S336.

Subsequently, the instance configuring unit 211 determines whether there is a remaining non-selected apparatus in the apparatuses retrieved in the process of S333. When there is a remaining non-selected apparatus (S336: YES), the instance configuring unit 211 returns to the process of S333 to select one of non-selected apparatuses and repeats the process.

When there is not a non-selected apparatus (S336: NO), the instance configuring unit 211 selects one apparatus ID 217-1 among the apparatus IDs 217-1 stored in the candidate table 217 (S337). For example, the instance configuring unit 211 selects a set of apparatus IDs 217-1 for which the usage rate of the physical resource is maximized.

Here, the instance configuring unit 221 may evaluate the usage rate of the physical resource such that the usage rate for a known candidate apparatus is higher than that of an unknown candidate apparatus. An unknown candidate apparatus is a candidate apparatus which does not provide a physical resource to any instance 11. A known candidate apparatus is a candidate apparatus which provides a physical resource to any one of the instances 11.

The reason why the usage rate is evaluated in this manner is because the LPAR mechanism 37 is not operating in the unknown candidate apparatus and a conversion cost for introducing a new LPAR mechanism 37 may occur. In contrast, since the LPAR mechanism 37 is operating in the known candidate apparatus, such a cost may not occur.

In the process of S337, the instance configuring unit 211 may select the set of bare-metal hosts 10a rather than the LPAR host 10c. This is because it is also possible to introduce the LPAR mechanism 37 to the bare-metal host 10a to form the LPAR host 10c. Moreover, the instance configuring unit 211 may move another instance 11 operating in the set selected from the candidate table in the process of S337 to another LPAR host as necessary.

For example, in the candidate table 217b illustrated in FIG. 11B, as indicated by the record of the candidate ID 217b-1 "CDDT-03," when the surplus resource 217b-2 of this physical computer is very small (for example, the surplus resource 217b-2 is smaller than a predetermined threshold) and this physical computer does not provide a physical resource to any other instance 11 (that is, this physical computer does not provide the physical resource to two or more instances 11), the instance configuring unit 211 may operate this physical computer according to the bare-metal method rather than the LPAR method. The instance 11 to which the physical resource is allocated from a physical computer operated according to the bare-metal method can obtain a relatively high performance since the overhead of the LPAR mechanism 37 is not present. Moreover, a predetermined license cost for this instance 11 may decrease. Therefore, the instance 11 has high cost effectiveness and satisfies the instance requirement.

Subsequently, the instance configuring unit 211 creates and deploys the instance 11 in the physical computer selected in the process of S337. As described above, the instance configuring unit 211 may introduce the LPAR mechanism 37 to the selected physical computer 10 as necessary.

The change of the physical computer implementation method and/or movement of other instances may be performed when a new instance 11 is created and deployed. In this way, the usage rate of the physical resource of the computer system 1 is optimized according to a time-varying situation. That is, even when an addition, a change, and a removal of the physical device associated with the physical computer 10 and an addition, a configurational change, a removal, and the like of the instance 11 occurs in the computer system 1, it is possible to increase the usage rate of the physical resource in the entire computer system 1 as much as possible.

For example, in the IaaS, a number of users may request creation, configurational change, removal, and the like of instances asynchronously. When a number of instances are collected in a small number of virtual machine hosts 10b, the usage rate of the physical resource in the entire computer system 1 is improved. However, in this case, different instances possessed by different users share the physical resource of one physical computer. Due to this, when a processing load of an instance possessed by a certain user increases, the performance of an instance possessed by another user may decrease.

In the bare-metal host 10a, such a decrease in the instance performance does not occur. However, when the usage rate of the physical resource of this instance is low, the usage rate of the physical resource in the entire computer system 1 decreases.

In the LPAR host 10c, since "monopoly" and "share" can be set for respective independent physical resources which are a portion of physical resources rather than "monopolizing" all physical resources of the physical computer, it is easy to increase the usage rate of the physical resource. However, if the number of physical devices included in the LPAR host 10c, the usage rate of each physical device, and the like are unknown, it is difficult to increase the usage rate effectively. Moreover, the physical device or the like included in the LPAR host 10c may be changed. A user who uses IaaS does not know the physical device included in such a LPAR host 10c. Due to this, under the instance requirement arbitrarily created by the user, it is difficult to effectively increase the usage rate of the physical resource in the LPAR host 10c.

In the present embodiment, the template information suitable for the configuration and the like of the computer system 1 is provided to a user to allow the user to create the instance requirement using the template information. In this way, it is possible to effectively increase the usage rate of the physical resource of the computer system 1. Moreover, the user can create the instance requirement more easily using the template information.

FIG. 13 illustrates a configuration example of the template use frequency table 218.

The information stored in the template use frequency table 218 is used when creating more appropriate template information.

The template information needs to be created so as to be suitable for both the configuration of the physical device of the physical computer 10 and the instance requirement desired by the user. If template information is not suitable for the configuration of a physical device of the physical computer 10, the usage rate of the physical resource may decrease when the template information is used.

For example, it is assumed that the template information has options for designating "monopoly" and "share" for two NICs collectively. In this case, even when the user wants to use one NIC as a monopolized resource, if this template information is used, the user can only designate "monopoly" for the two NICs collectively. Although the instance 11 configured in this manner "monopolizes" the physical resources of the two NiCs, it is highly likely that the instance Generally uses the physical resource of one NIC only. In this case, the usage rate of the physical resource of the NIC in the physical computer 10 decreases.

Moreover, the configuration of the physical device included in the physical computer 10 may be changed. For example, a physical device of which the support period has expired may be replaced with another physical device. For example, a contract content associated with a physical device may be updated depending on the supplier's condition of the physical device or a change in demand or the like. When the configuration of the physical device is changed in this manner, it is necessary to create more appropriate template information.

In the template use frequency table 218, the template information and information on the use frequency of template information (referred to as "derived template information") derived from the template information may be stored.

The derived template information may be created on the basis of a template requirement created by changing the content of original template information. The default value and the like set to the derived template information may be calculated on the basis of how the user has changed the default value set to the original template information. In this calculation, a statistical method such as cluster analysis may be applied. In this way, the management computer 200 can create derived template information including the default value and the like which reflect the demand of many users.

The template use frequency table 218 includes a template ID 218-1, a derived template ID 218-2, a use frequency 218-3, a difference 218-4, and an approximation model 218-5 as examples of a field value.

The use frequency 218-3 is a value indicating the frequency with which template information or derived template information (referred to as "template information or the like") is used by users. The use frequency 218-3 may be a total number of times the template information or the like is used or the number of users who used the template information or the like. Moreover, the use frequency 218-3 may be the use frequency of the template information or the like in a predetermined period. The use frequency 218-3 may be added when the template information or the like is used for creating the instance 11. The use frequency 218-3 may be subtracted when the instance 11 created by the template information or the like is removed or the configuration thereof is changed.

The difference 218-4 is information indicating the difference in the physical resource 14 between the original template information and the derived template information. The difference may be calculated on the basis of the change made by the user in the process of S330 in FIG. 12.

The approximation model 218-5 is information indicating a resource configuration (referred to as a "resource configuration model") of physical computers having a plurality of different models to which the resource configuration set to the template information or the like is approximate.

For example, the record of the template ID 218-1 "TMP3023-9002" illustrated in FIG. 13 indicates that the approximation model 218-5 is "½-A model". This indicates that the resource configuration set to the template information of the template ID 218-1 "TMP3023-9002" is approximate to the configuration of ½ of the physical resource possessed by a resource configuration model "A model". For example, when the resource configuration model "A model" has four NICs, two NICs are set to the template information of the approximation model "½-A model".

The resource configuration model may indicate the configuration of the physical resource of any one of the physical computer 10, the network apparatus, and the storage apparatus 100 that form the computer system 1. The resource configuration model may be expressed by a model number defined by the apparatus manufacturer or a product name or the like.

Figure 14:
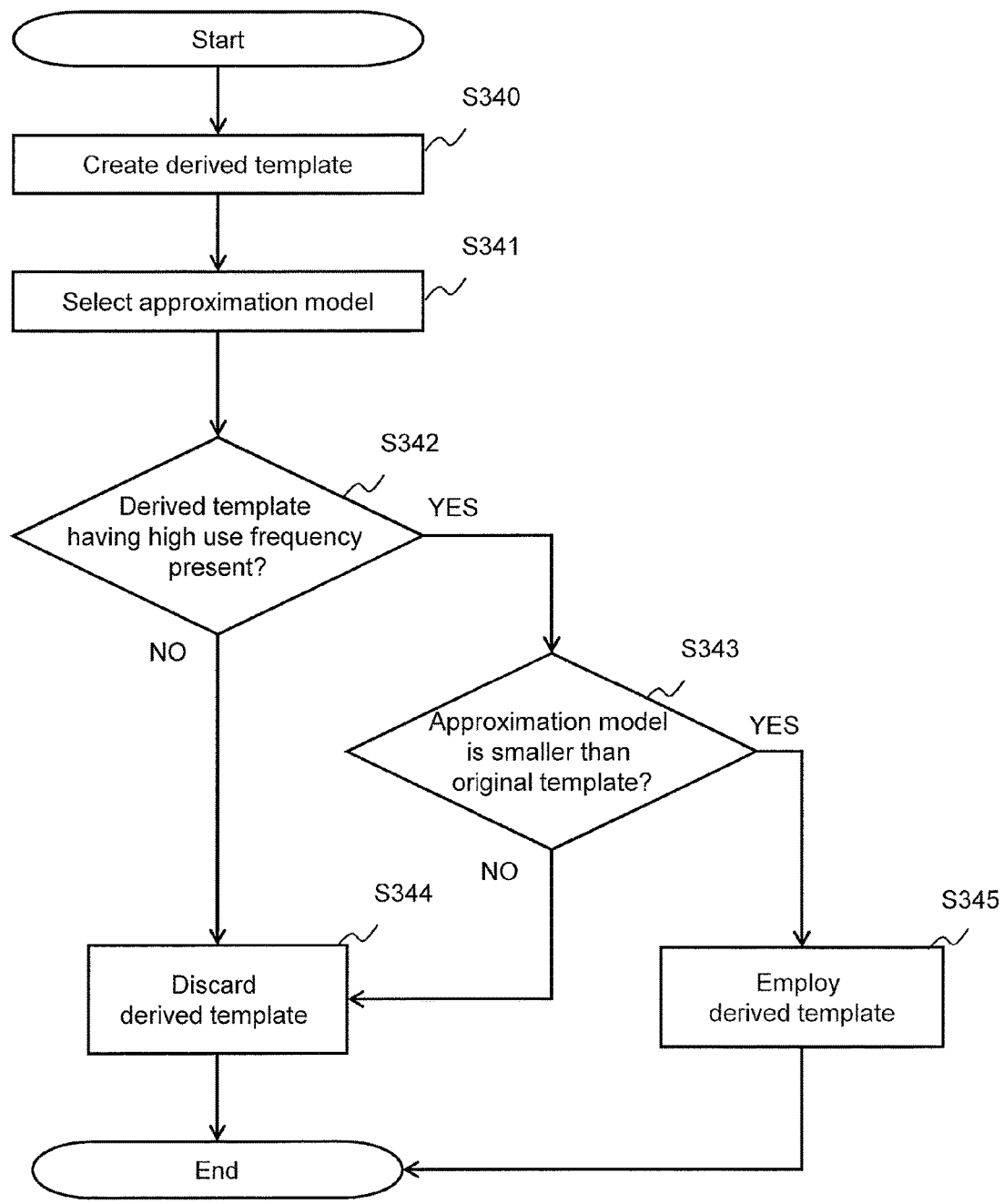
FIG. 14 illustrates an example of a derived template information creation process.

FIG. 14 illustrates an example of a derived template information creation process.

The instance configuring unit 211 creates derived template information on the basis of template information (S340). The instance configuring unit 211 may classify the configuration of the instance 11 on the basis of the item changed by the user from the template information and create the derived template information. Moreover, the instance configuring unit 211 stores the record associated with the derived template information in the template use frequency table 218.

The instance configuring unit 211 calculates the use frequency and the approximation model for the created derived template information. Moreover, the instance configuring unit 211 stores the calculation result in the use frequency 218-3 and the approximation model 218-5 of the record associated with the created derived template information in the template use frequency table 218 (S341).

The instance configuring unit 211 retrieves derived template information of which the use frequency 218-3 is higher than that of the original template information from the template use frequency table 218 (S342). The derived template information retrieved herein may be more suitable for the user's needs than the original template information created by the business operator of the computer system 1. That is, it can be said that there is room for improvement on the original template information.

When the derived template information of which the use frequency 218-3 is higher than the original template information is not retrieved (S342: NO), the instance configuring unit 211 may discard the derived template information (S344) and may end this process.

When the derived template information of which the use frequency 218-3 is higher than the original template information is retrieved (S342: YES), the instance configuring unit 211 executes the following process on the retrieved derived template information.

The instance configuring unit 211 determines whether the segmentation granularity in the approximation model 218-5 of the derived template information is smaller than that of the original template information by referring to the template use frequency table 218 (S343). That is, it is determined whether the derived template information enables the physical resource 14 to be allocated in smaller units than the template information.

When the segmentation granularity in the approximation model 218-5 of the derived template information is smaller than that of the original template information (S343: YES), the instance configuring unit 211 may employ the derived template information in the template information (S345) and may end this process. For example, the instance configuring unit 211 may store the derived template information in the template information table 214 as new template information. Alternatively, the instance configuring unit 211 may replace the original template information with this derived template information in the template information table 214.

When the segmentation granularity in the approximation model 218-5 of the original template information is equal to or smaller than that of the derived template information (S343: NO), the instance configuring unit 211 may discard this derived template information (S344) and may end this process.

For example, in the template use frequency table 218 illustrated in FIG. 13, the use frequency 218-3 "190" of the derived template information "derivation 2" from the original template information "TMP3023-9002" is higher than the use frequency 218-3 "182" of the original template information.

The approximation model 218-5 "⅓-B model" of the derived template information "derivation 2" has a smaller segmentation granularity than the approximation model 218-5 "½-A model" of the original template information. In this case, the derived template information "derivation 2" of the original template information "TMP3023-9002" may be employed as new instance information.

When derived template information is created, the instance configuring unit 211 may execute the following process. The instance configuring unit 211 selects an examination target instance from the instance information table 212. Moreover, the instance configuring unit 211 determines whether the instance is configured on the basis of the original template information of this derived template information. When this determination result is positive, the instance configuring unit 211 may change the configuration of this instance so as to be suitable for the setting of the derived template information on the basis of the user's approval.

By the above-described process, it is possible to automatically create template information which is suitable for the user's needs on the basis of the use frequency 218-3 of the original template information, the use frequency 218-3 of the derived template information changed from the original template information, and the like.

According to the present embodiment, since many instances can be easily created and deployed in one physical computer, it is possible to improve the usage rate of physical resources. In this way, the business operator of the computer system 1 can improve the cost effectiveness in operation of the computer system 1.

Moreover, since the derived template information suitable for the user's needs is automatically created from the template information, it is possible to improve the usage rate of physical resources.

Moreover, even when the configuration of a computer system or the configuration or the like of a physical device of a physical computer is changed or even when the user's needs for the instance requirement is changed, it is possible to automatically create derived template information suitable for the change.

The above-described embodiments are examples for describing the present invention and it is not intended that the range of the present invention is not limited to these embodiments only. The present invention can be embodied in various other aspects by those skilled in the art without departing from the scope of the present invention.

REFERENCE SIGNS LIST

1 Computer system
10 Physical computer
70 Client terminal

100 Storage apparatus
200 Management computer
24 Virtualization mechanism
37 LPAR mechanism

The invention claimed is:

1. A computer system comprising:

a plurality of computers; and a management system configured to manage the plurality of computers, wherein the management system manages instances implemented by the plurality of computers allocating physical resources, the instances are physical, comprises:

instance configuration information, being information which includes a setting for configuring an instance, the information includes a setting for necessity of monopolization for each of a plural kinds of physical resources of the instance:

resource information which includes allocation information for each of the plural kinds of physical resources that the computer system provides;

topology information which includes information of a connect device that can provide a physical resource to the instance;

search the physical resource in which the allocation information is not allocated among the resource information as to the physical resource in which the setting indicating that monopolization is required for the instance configuration information is included;

search a connected device that can be allocated to the physical resource in which the setting indicating that monopolization is required to the instance configuration information from the topology information among connect devices that can be connected to the searched physical resource;

select an instance implementation method corresponding to the instance configuration information based on the searched physical resource and the connected device; and the plurality of computers provide the physical resource to the instance based on the selected instance implementation method.

2. The computer system according to claim 1, wherein among physical resources in which the setting indicating that monopolization is required is not set in the instance configuration information, the management system allocates the physical resource, which is allocated to any one of the instances, preferentially to the instance.

3. The computer system according to claim 1, wherein
the management system is a computer for which setting was made so that all or some of the physical resources that one computer provides are allocated in a monopolizable manner to one instance, and allocates all physical resources provided by the computer to one instance in a monopolizable manner when a number of physical resources which are not allocated to any of the instances of the computer is smaller than a predetermined threshold and the computer does not provide a physical resource to two or more instances.

4. The computer system according to claim 1, wherein
when a physical resource of a second computer, different from a first computer that implements the instance, is provided to the instance, the management system determines the second computer based on a network topological distance from the first computer.

5. The computer system according to claim 1, wherein
the management system has template information including a default setting for the settings included in the instance configuration information, and
the default setting is determined based on the physical resources that can be provided by the plurality of computers.

6. The computer system according to claim 5, wherein
the management system creates the template information including a new default setting based on a use frequency of the template information and a setting changed from the default setting of the template information.

7. A management system managing a plurality of computers, wherein
the management system is a computer which is configured to manage instances implemented by the plurality of computers allocating physical resources, the instances are physical, comprises:

instance configuration information, being information which includes a setting for configuring an instance, the information includes setting for necessity of monopolization for each of a plural kinds of physical resources of the instance;

resource information which includes allocation information for each of the plural kinds of physical resources that the computer system provides;

topology information which includes information of a connect device that can provide a physical resource to the instance;

search physical resource in which the allocation information is not allocated among the resource information as to the physical resource in which setting indicating that monopolization is required for the instance configuration information is included;

search a connected device that can be allocated to the physical resource in which setting indicating that monopolization is required to the instance configuration information from the topology information among connect devices that can be connected to the searched physical resource;

selects an instance implementation method corresponding to the instance configuration based on the searched physical resource and the connect device, and the plurality of computers are caused to provide the physical resource to the instance based on the selected instance implementation method.

8. A resource management method for managing physical resources of a plurality of computers, the method comprising, by a management system that manages the plurality of computers:

managing instances implemented by the plurality of computers allocating physical resources, the instances are physical; comprises:

instance configuration information, being information which includes setting for configuring an instance, the information includes setting for necessity of monopolization for each of a plural kinds of physical resources of the instance;

resource information which includes allocation information for each of the plural kinds of physical resources that the computer system provides;

topology information which includes information of a connect device that can provide the physical resource to the instance;

search the physical resource in which the allocation information is not allocated among the resource information as to the physical resource in which the setting indicating that monopolization is required for the instance configuration information is included;

search a connected device that can be allocated to the physical resource in which the setting indicating that monopolization is required to the instance configuration information from the topology information among connect devices that can be connected to the searched physical resource;

selecting an instance implementation method corresponding to the instance configuration information among based on the searched physical resource and the connected device; and allowing the plurality of computers to provide the physical resource to the instance based on the selected instance implementation method.

* * * * *